United States Patent

Etemad

(10) Patent No.: US 9,497,762 B2
(45) Date of Patent: *Nov. 15, 2016

(54) MULTICARRIER TECHNIQUES FOR WIRELESS SYSTEMS

(71) Applicant: Intel Corporation, Santa Clara, CA (US)

(72) Inventor: Kamran Etemad, Potomac, MD (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/706,275

(22) Filed: Dec. 5, 2012

(65) Prior Publication Data

US 2013/0107766 A1 May 2, 2013

Related U.S. Application Data

(63) Continuation of application No. 13/269,013, filed on Oct. 7, 2011, now Pat. No. 8,560,009, which is a continuation of application No. 11/748,310, filed on May 14, 2007, now Pat. No. 8,036,702.

(51) Int. Cl.
*H04W 72/04* (2009.01)
*H04L 5/00* (2006.01)
*H04L 27/26* (2006.01)

(52) U.S. Cl.
CPC .......... *H04W 72/0453* (2013.01); *H04L 5/001* (2013.01); *H04L 5/0007* (2013.01); *H04L 5/0044* (2013.01); *H04L 5/0053* (2013.01); *H04L 5/0064* (2013.01); *H04L 5/0087* (2013.01); *H04L 27/2601* (2013.01)

(58) Field of Classification Search
CPC ................................................. H04W 72/0453
USPC ......... 370/329, 280, 252, 342; 455/423, 522
See application file for complete search history.

(56) References Cited

U.S. PATENT DOCUMENTS

| | | | | |
|---|---|---|---|---|
| 6,252,909 B1 * | 6/2001 | Tzannes et al. | | 375/260 |
| 6,289,221 B1 | 9/2001 | Ritter | | |
| 6,430,401 B1 * | 8/2002 | Lou et al. | | 455/108 |
| 6,611,506 B1 * | 8/2003 | Huang et al. | | 370/329 |

(Continued)

FOREIGN PATENT DOCUMENTS

| | | |
|---|---|---|
| CN | 1917409 | 2/2007 |
| EP | 1916790 A1 | 4/2008 |

(Continued)

OTHER PUBLICATIONS

Stanwood, Ken et al., IEEE C802.16m-08/521r1: Comments on new multicarrier text in SDD, (Jul. 15, 2008); 5 pages.

(Continued)

*Primary Examiner* — Rasheed Gidado

(57) ABSTRACT

Multicarrier techniques for wireless communications system are described. An apparatus may comprise a carrier management module to define a primary carrier for use by a multicarrier communications system to communicate control information, and a secondary carrier for use by the multicarrier communications system to communicate media information, with the secondary carrier having a communication parameter and technology that is potentially different from the primary carrier. Other embodiments are described and claimed.

18 Claims, 4 Drawing Sheets

(56) References Cited

U.S. PATENT DOCUMENTS

| | | | |
|---|---|---|---|
| 6,741,554 B2* | 5/2004 | D'Amico et al. | 370/225 |
| 6,804,214 B1* | 10/2004 | Lundh et al. | 370/335 |
| 6,970,709 B1* | 11/2005 | Williams | 455/452.1 |
| 7,233,800 B2* | 6/2007 | Laroia et al. | 455/456.1 |
| 7,274,754 B2* | 9/2007 | Boehlke et al. | 375/308 |
| 7,432,961 B2 | 10/2008 | Takeshita | |
| 7,577,118 B2 | 8/2009 | Haumonte et al. | |
| 7,616,696 B1 | 11/2009 | Mansour et al. | |
| 7,751,305 B2 | 7/2010 | Jung et al. | |
| 7,912,057 B2 | 3/2011 | Petry et al. | |
| 8,036,702 B2 | 10/2011 | Etemad | |
| 8,145,229 B1* | 3/2012 | Mansour | 455/452.2 |
| 8,391,254 B2* | 3/2013 | Koo et al. | 370/338 |
| 2003/0050070 A1 | 3/2003 | Mashinsky et al. | |
| 2004/0106412 A1* | 6/2004 | Laroia et al. | 455/448 |
| 2006/0223460 A1 | 10/2006 | Himayat et al. | |
| 2006/0274712 A1 | 12/2006 | Malladi et al. | |
| 2007/0070908 A1 | 3/2007 | Ghosh et al. | |
| 2007/0072605 A1 | 3/2007 | Poczo | |
| 2007/0097981 A1 | 5/2007 | Papasakellariou | |
| 2007/0104129 A1 | 5/2007 | Yang et al. | |
| 2007/0177654 A1 | 8/2007 | Levitine et al. | |
| 2007/0232349 A1 | 10/2007 | Jones et al. | |
| 2007/0270135 A1* | 11/2007 | Gaschler | 455/414.3 |
| 2011/0105136 A1 | 5/2011 | Choi | |

FOREIGN PATENT DOCUMENTS

| | | |
|---|---|---|
| WO | 2005109917 | 11/2005 |
| WO | 2006104408 | 10/2006 |
| WO | 2007014310 | 2/2007 |
| WO | WO2007019807 A1 | 2/2007 |
| WO | 2008144208 | 11/2008 |

OTHER PUBLICATIONS

PCT Search Report for International Application No. PCT/US2008/062608, mailed Oct. 15, 2008; 10 pages.

Office Action received for Korean Patent Application No. 2009-7023678, mailed on Mar. 14, 2011, 4 pages English translation.

Office Action received for Chinese Patent Application No. 200880015933.0 mailed on Mar. 1, 2012, 15 pages including 8 pages English translation.

Office Action received for Chinese Patent Application No. 200880015933.0, mailed on Nov. 14, 2012, 26 pages including 16 pages English translation.

Extended European Search Report Received for European Patent Application No. 08747620, mailed Mar. 31, 2014, 9 pages.

Motorola, "Physical Channel Definition for Downlink Dual Carrier Operation", 3GPP Draft, vol. TSG Geran, XP050015822, Apr. 19, 2006, 8 pages.

Dong et al.,"An Efficient Priority-Based Dynamic Channel Allocation Strategy for Mobile Cellular Networks", INFOCOM 97, Sixtenth Annual Joint Conference of the IEEE Computer and Communications Societies, vol. 2, Apr. 7-11, 1997, 9 pages.

European Search Report, Mailed Jun. 1, 2016, Application No. 16158831.4, Filed Mar. 4, 2016, pp. 4.

* cited by examiner

400

DEFINE A PRIMARY CARRIER AND A SECONDARY CARRIER FOR USE BY A MULTICARRIER COMMUNICATIONS SYSTEM, THE SECONDARY CARRIER HAVING A COMMUNICATION PARAMETER DIFFERENT FROM THE PRIMARY CARRIER
402

COMMUNICATE CONTROL INFORMATION USING THE PRIMARY CARRIER AND MEDIA INFORMATION USING THE SECONDARY CARRIER
404

FIG. 4

MULTICARRIER TECHNIQUES FOR WIRELESS SYSTEMS

CROSS-REFERENCE TO RELATED APPLICATIONS

This application is a continuation claiming the benefit of, and priority to, previously filed U.S. patent application Ser. No. 13/269,013 filed Oct. 7, 2011, entitled "Multicarrier Techniques for Wireless systems," which is a continuation of patent application Ser. No. 11/748,310 filed May 14, 2007, the entirety of which are hereby incorporated by reference.

BACKGROUND

With ever growing demand for mobile broadband data services and a shortage of contiguously large portions of the radio-frequency (RF) spectrum for deployment, next generation broadband wireless access networks may be deployed with fewer RF spectrum resources. Furthermore, as the systems are deployed and the need for higher data rates arises, the performance demands of the broadband wireless access networks may increase. For example, streaming broadband video requires significant amounts of bandwidth that is increasingly difficult to provide with the limited RF spectrum resources typically assigned to a wireless communications system. In addition, more users are migrating towards wireless communications systems for their communications services, thereby increasing system load and further decreasing the bandwidth available to any one user or the collective system overall. Consequently, there may be a substantial need to improve performance of wireless communication systems by more efficiently using the RF spectrum available to a device, network or system.

BRIEF DESCRIPTION OF THE DRAWINGS

FIG. 4 illustrates one embodiment of a logic flow.

DETAILED DESCRIPTION

Figure 1:
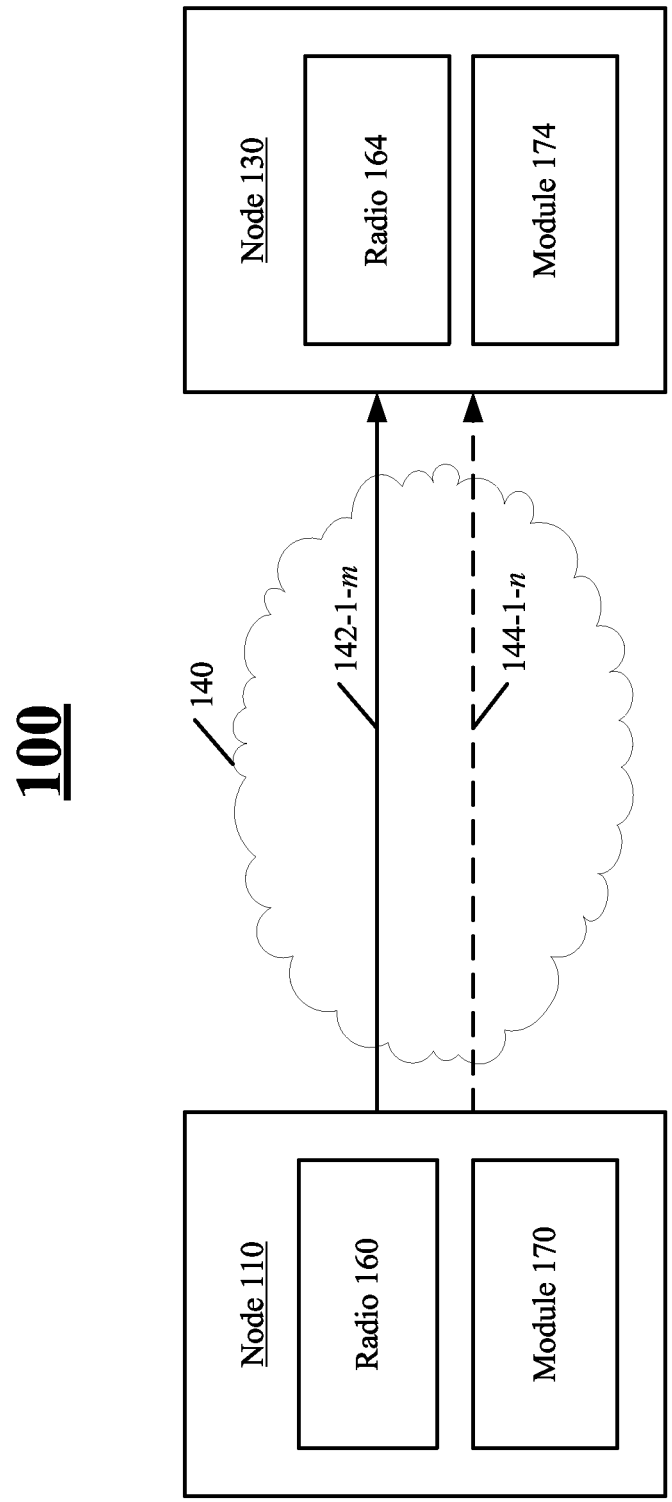
FIG. 1 illustrates one embodiment of a network.

Various embodiments are generally directed to improvements for wireless communications systems. Some embodiments are particularly directed to techniques for improving RF spectrum utilization by multicarrier communications systems. Examples of multicarrier communication systems include without limitation systems compliant with various Institute of Electrical and Electronics Engineers (IEEE) standards, such as the IEEE 802.11 standards for Wireless Local Area Networks (WLANs), the IEEE 802.16 standards for Wireless Metropolitan Area Networks (WMANs), and the IEEE 802.20 or Mobile Broadband Wireless Access (MBWA), among others. For example, the Worldwide Interoperability for Microwave Access (WiMAX) is a wireless broadband technology based on the IEEE 802.16 standard of which IEEE 802.16-2004 and the 802.16e amendment (802.16e-2005) are Physical (PHY) layer specifications.

Various embodiments attempt to increase effective bandwidth by using data aggregation techniques across multiple carriers to provide variable bandwidth for multicarrier communications systems. The data aggregation may be accomplished across a heterogeneous mix of contiguous or non-contiguous RF spectrum. Further, the data multicarrier operation may be accomplished across a heterogeneous mix of communication technologies and equipment operating in different bandwidths and duplexing methods. The multicarrier data aggregation effectively creates wider band channels with higher peak throughput, while supporting a mix of legacy low bandwidth and the new multicarrier terminals. The multicarrier data aggregation may be used in the downlink and/or uplink asymmetrically based on system load and peak rate or Quality of Service (QoS) demand. The proposed multicarrier enhancements also allow load sharing across multiple carriers.

Various embodiments are directed to multicarrier management techniques to define multiple types of channels or carriers for a multicarrier communications system. The first or primary carrier may comprise of all common control channels to communicate control information as well as user data. The second or secondary carrier may mainly comprise of data channels to communicate media information, with minimal or no support for signaling. In some cases, multiple primary carriers may be used for a single secondary carrier. Similarly, multiple secondary carriers may be used for a single primary carrier. The number of primary carriers and secondary carriers may increase or decrease depending upon the bandwidth needed for a given client, such as a device, network or system. For example, the more bandwidth a client needs the greater the number of available secondary carriers may be created and aggregated to provide the requisite bandwidth. Conversely, the less bandwidth a client needs the fewer the number of available secondary carriers are needed to provide the requisite bandwidth. In the latter case, reducing the number of primary or secondary carriers may release or free RF spectrum resources for use by another client. In this manner, a general multicarrier architecture or scheme may service a given client according to the particular needs of the client and in view of a total availability of RF spectrum resources.

Various embodiments may also dynamically vary bandwidth for a client based on client needs or resource availability. The instantaneous bandwidth demands of a given client may vary over time. The available RF spectrum to provide such bandwidth may also vary over time based on a host of factors, not the least of which is an instantaneous number of clients using RF resources and the particular bandwidth demands for those clients. Consequently, some embodiments may attempt to dynamically or semi-dynamically balance bandwidth assignments over time based on client demands and RF resource availability. Accordingly, some embodiments may dynamically allocate or release channels or carriers to accommodate changes in bandwidth demands for a given client, whether that client is a device, network or entire system.

FIG. 1 illustrates one embodiment of a network 100. The network 100 may comprise multiple nodes, such as nodes 110, 130. A node generally may comprise any physical or logical entity for communicating information in the network 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, the nodes 110, 130 may be arranged to communicate control information and media information over wireless shared media 140. In the illustrated embodiment, the node 110 may comprise a wireless transmitter node designated as a source (S) node, and the node 130 may comprise a wireless receiver node designated as a destination (D) node. A more detailed block diagram and description for the nodes 110, 130 are provided below with reference to FIGS. 3 and 4.

In various embodiments, the S node 110 may represent any transmitting node. In one embodiment, for example, the S node 110 may represent a network point of attachment. A network point of attachment may comprise any device capable of acting as a communication hub for wireless client devices to connect to a wired network from a wireless network. Network points of attachment may include, but are not necessarily limited to, a wireless access point (AP), a WiFi or WLAN AP (e.g., hotspots), a WiMAX wireless broadband base station, a cellular base station, a mobile subscriber center, a radio network controller, a router, a switch, a bridge, a gateway, and any other device capable of acting as a communication hub for wireless client devices to connect to a wired network from a wireless network and to extend the physical range of service of a wireless network. The embodiments are not limited in this context.

In one embodiment, for example, the D node 130 may represent any receiving node. In one embodiment, for example, the D node 130 may represent a wireless client device. A wireless client device may include any electronic device having wireless capabilities, including a processing system, a computer system, a computer sub-system, a computer, an appliance, a workstation, a terminal, a server, a personal computer (PC), a laptop, an ultra-laptop, a hand-held computer, a personal digital assistant (PDA), a set top box (STB), a telephone, a mobile telephone, a cellular telephone, a handset, a subscriber station (SS), a microprocessor, an integrated circuit such as an application specific integrated circuit (ASIC), a programmable logic device (PLD), a processor such as general purpose processor, a digital signal processor (DSP) and/or a network processor, and so forth. The embodiments are not limited in this context.

It is worthy to note that although a given node 110, 130 may be designated a transmitting node or receiving node in various embodiments by way of example, such designations are provided for sake of clarity and not limitation. It may be appreciated that either node 110 or 130 may comprise a transmitting node or receiving node. In some cases, the nodes 110, 130 may each comprise both a transmitting node and a receiving node. For example, the nodes 110, 130 may each be equipped with a wireless transmitter/receiver ("transceiver"), along with associated wireless equipment typically implemented for a wireless communication device (e.g., antennas, amplifiers, filters, processors, and so forth), thereby providing both nodes 110, 130 with transmitting and receiving capabilities.

In various embodiments, the nodes 110, 130 may include respective wireless transceivers or radios 160, 164. The radios 160, 164 may be compliant with one or more wireless communication standards, such as standards promulgated by IEEE, the Internet Engineering Task Force (IETF), the International Telecommunications Union (ITU), the Joint Technical Committee (JTC) of European Telecommunications Standards Institute (ETSI), the European Committee for Electrotechnical Standardization (CENELEC), the European Broadcasting Union (EBU), and so forth. In various embodiments, the radios 160, 164 may be compliant with one or more IEEE 802.XX standards including IEEE 802.11 standards (e.g., 802.11a, b, g/h, j, n, and variants), the IEEE 802.16 standards (e.g., 802.16-2004, 802.16.2-2004, 802.16e-2005, 802.16f, and variants), the IEEE 802.20 standards and variants, and so forth. In various embodiments, the radios 160, 164 may also be compliant with one or more Digital Video Broadcasting (DVB) standards including the ETSI Digital Video Broadcasting Terrestrial (DVB-T) broadcasting standards and variants, the DVB Handheld (DVB-H) broadcasting standards and variants, the Digital Multimedia Broadcasting (DMB) broadcasting standards and variants. The embodiments are not limited in this context.

In various embodiments, the radios 160, 164 may communicate information over wireless shared media 140. The wireless shared media 140 may comprise one or more allocations of RF spectrum. The allocations of RF spectrum may be contiguous or non-contiguous. The radios 160, 164 may communicate information over the wireless shared media 140 using various multicarrier techniques utilized by, for example, WiMAX or WiFi systems. For example, the radios 160, 164 may utilize MIMO techniques to perform beam forming, spatial diversity or frequency diversity, as described in more detail with reference to FIG. 3.

In various embodiments, the nodes 110, 130 may include respective carrier management modules 162, 166. The carrier management modules 170, 174 may be generally arranged to define multiple types of channels or carriers for a multicarrier communications system. A first type may comprise a primary carrier to operate as a control channel to communicate control information as well as user data. A second type may comprise a secondary carrier to operate as a media or data only channel to communicate media information. By separating the control channel from the media only channel, the network 100 has greater flexibility in dynamically assigning large portions of the RF spectrum to given clients. For example, a client may monitor the control channel to receive configuration parameters for any changes made to the media channel, and vice-versa. Having multiple channels ensures a greater probability that channel modifications are propagated to the affected clients. Defining different types of carriers provides other advantages as well, which are discussed in more detail later. It is worthy to note that although various embodiments may discuss certain multicarrier management operations with reference to both the carrier management modules 170, 174, it may be appreciated that some or all of the multicarrier management operations may be performed by the carrier management module 170, the carrier management module 174, or a combination of both carrier management modules 170, 174.

In one embodiment, the carrier management modules 170, 174 may be arranged to define one or more primary carriers 142-1-*m* for use by the multicarrier communications system. The primary carriers are designed to communicate primarily control information, and in some cases limited media information. Control information may refer to any data representing commands, instructions or control words meant for an automated system. For example, control information may be used to route media information through a system, or instruct a node to process the media information in a predetermined manner. In one embodiment, for example, the control information may include the full range of media access control (MAC) messaging, signaling plane messaging, control plane messaging, and so forth. For example, a primary carrier may be used to provide all broadcast and common control messaging to the client devices, including control messages needed to manage client state transitions, such as transitioning from an active mode to a sleep mode or idle mode. Although the primary carriers are designed to communicate control information, however, one or more primary carriers may also be used to communicate media information as needed by the network 100.

In various embodiments, the carrier management modules 170, 174 may be arranged to define multiple primary carriers. For example, when the number of users in a given sector is relatively large, the carrier management modules 170, 174 may define multiple primary carriers and define an algorithm to semi-statically distribute users and their MAC/signaling traffic across the multiple primary carriers. The users can select and attach to different primary carriers based on their MAC address or other hardware identification numbers, or randomly choose one of the available primary carriers.

In one embodiment, for example, the carrier management modules 170, 174 may be arranged to define one or more secondary carriers 144-1-$n$ for use by a multicarrier communications system. The secondary carriers are designed to communicate primarily media information, and in some cases limited control information. Media information generally may refer to any data representing content meant for a user, such as image information, video information, graphical information, audio information, voice information, textual information, numerical information, alphanumeric symbols, character symbols, and so forth. For example, the secondary carriers would be suitable for broadcasting streaming video information or downloading large data files. The secondary carriers would typically communicate only a preamble, optionally few broadcast indicators, and the remainder user data. Optionally, some or all signaling and MAC messages may also be transmitted on secondary carriers as needed by the network 100.

In various embodiments, the carrier management modules 170, 174 may be arranged to define multiple secondary carriers. For example, the more bandwidth a client needs the greater the number of available secondary carriers may be created and aggregated to provide the requisite bandwidth. Conversely, the less bandwidth a client needs the fewer the number of available secondary carriers are needed to provide the requisite bandwidth. In the latter case, reducing the number of primary or secondary carriers may release or free RF spectrum resources for use by another client. As a result, the multicarrier data aggregation across multiple secondary carriers effectively creates wider band channels with higher peak throughput for the network 100.

In various embodiments, the secondary carrier may have a communication parameter different from the primary carrier. Examples of communication parameters may include values representing a channel bandwidth, a duplexing mode, a spectrum allocation, a downlink-to-uplink ratio, and other measurable communications system characteristic. For example, the primary carrier may provide a channel bandwidth of 5 MHz, while the secondary carrier provides a channel bandwidth of 40 MHz. In another example, the primary carrier may utilize a Time Division Duplex (TDD) mode, while the secondary carrier provides Frequency Division Duplex (FDD) mode. In yet another example, the primary carrier may utilize a first RF spectrum allocation, while the secondary carrier utilizes a second RF spectrum allocation. As previously described, the first and second RF spectrum allocations may be contiguous or non-contiguous relative to each other. In still another example, the downlink-to-uplink bandwidth ratio may vary or be asymmetric. For example, the downlink bandwidth may be relatively large to receive streaming video, while the uplink bandwidth is relatively small to receive user selections. It is worthy to note that the communication parameters and values described above are by way of example and not limitation, and that any number of communication parameters and values may be used for a given implementation based on a given set of design and performance constraints. The embodiments are not limited in this context.

In various embodiments, the ratio of primary carriers to secondary carriers may vary. In some embodiments, the ratio of primary carriers to secondary carriers is symmetric, where there is a single primary carrier for each secondary carrier and vice-versa. In some embodiments, the ratio of primary carriers to secondary carriers is asymmetric, where there are multiple primary carriers for each secondary carrier, multiple secondary carriers for each primary carrier, or multiple primary carriers for multiple secondary carriers.

In one embodiment, for example, the nodes 110, 130 may use the defined primary carriers and secondary carriers to communicate respective control information and media information via respective radios 160, 164. By defining two separate types of carrier classes, however, the nodes 110, 130 may also use the multiple carrier classes as redundancy or backup communication channels. For example, if the bandwidth demand for the secondary carriers is greater than the bandwidth availability provided by the secondary carriers, then the nodes 110, 130 may use one or more of the primary carriers to handle overflow data traffic to effectively increase instantaneous peak throughput. In another example, if the primary carrier is impaired or lost due to reduced signal-to-noise ratio (SNR), congestion, cross-talk, and a myriad of other factors affecting channel quality or throughput for wireless systems, then the nodes 110, 130 may use one or more secondary carriers to communicate control information to the clients. In yet another example, if the nodes 110, 130 may dynamically change the definitions for the primary carriers or secondary carriers, the nodes 110, 130 may use one carrier to propagate the changes made to the other carrier without having the nodes 110, 130 lose connectivity.

In various embodiments, the carrier management modules 170, 174 may be arranged to dynamically modify a communication parameter for a primary carrier or a secondary carrier based on a system performance parameter. Examples of system performance parameters may include values representing a system load, a system peak rate, a priority, a QoS, or other performance characteristic. For example, changes in system load or client/traffic priority may affect the amount of channel bandwidth available to a given client. In this case, the carrier management modules 170, 174 may allocate or release various primary and/or secondary carriers to increase or decrease bandwidth accordingly. In another example, changes in QoS demands may affect the particular RF spectrum allocated to a primary or secondary carrier. These are merely a few examples, and it may be appreciated that any number of communication parameters and/or system performance parameters and their relationships may be defined for a given implementation.

In various embodiments, the carrier management modules 170, 174 may be arranged to define the primary carrier with a first portion of a RF spectrum, and the secondary carrier with a second portion of the RF spectrum. In this manner, the carrier management modules 170, 174 facilitate data aggregation across a heterogeneous mix of contiguous or non-contiguous RF spectrum. In one embodiment, the first portion and second portion may comprise contiguous RF spectrum. For example, a WiMAX system may have allocated spectrum in the 1.9-2.6 GHz range. A primary carrier may utilize a first portion of the available RF spectrum in the 2.5-2.6 GHz range, while the secondary carrier may utilize a second portion of the available RF spectrum in the 2.6-2.7 GHz range, with the appropriate guard bands. In one embodiment, the first portion and second portion may comprise non-contiguous radio frequency spectrum. For example, a primary carrier may utilize a first portion of the available RF spectrum in the 1.9-2.0 GHz, and the secondary carrier may utilize a second portion of the available RF spectrum in the 2.5-2.7 GHz range. In some cases, the first portion and the second portion may partially overlap. The embodiments are not limited in this context.

Figure 2:
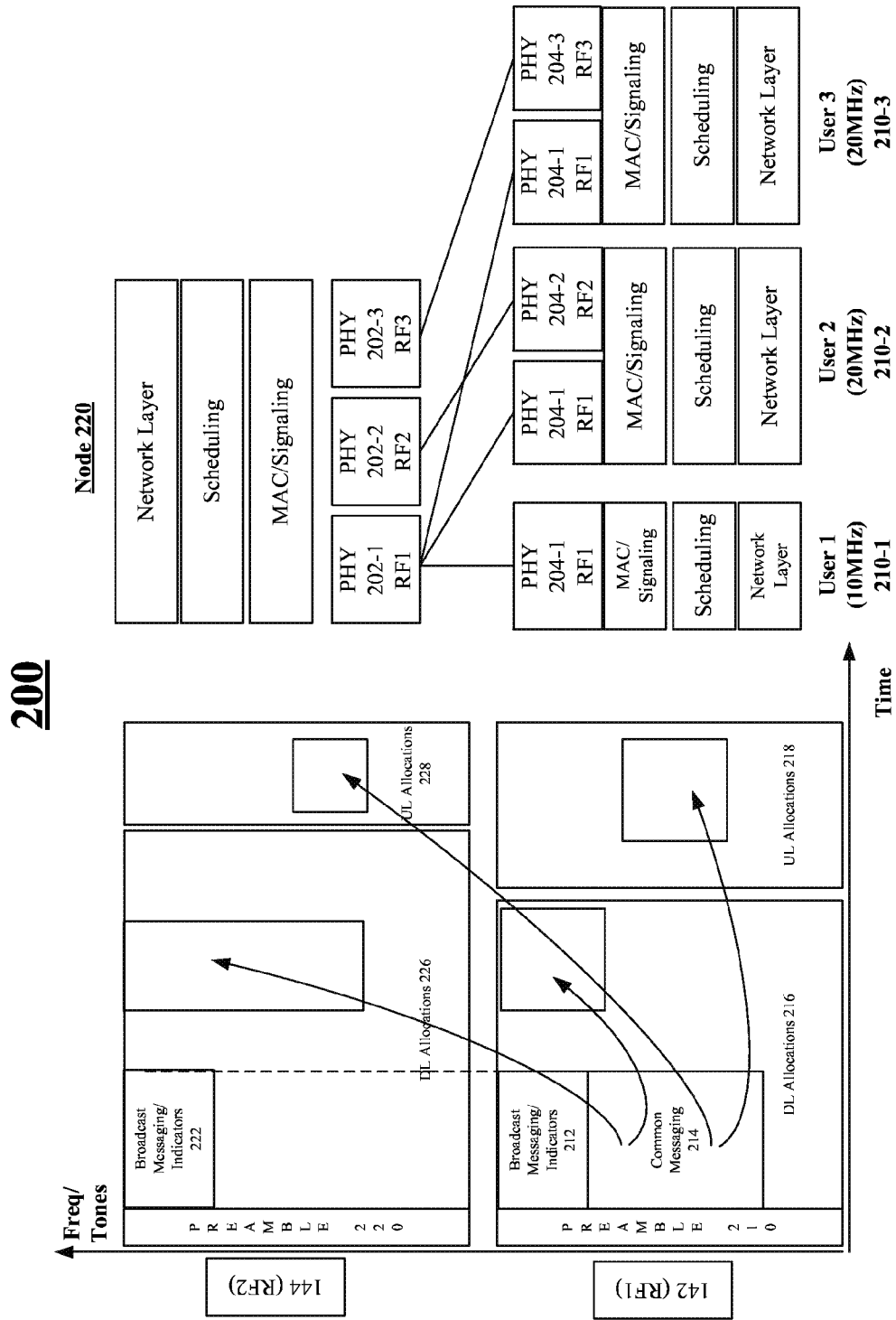
FIG. 2 illustrates one embodiment of network data flow.

FIG. 2 illustrates one embodiment of network data flow 100. The network data flow 100 represents a data flow for messaging provided over a primary carrier 142 (RF1) and a secondary carrier 144 (RF2). As shown in FIG. 2, a S node 110 may send some control information to D node 130 over wireless shared media 140 using both carriers 142, 144. For example, the S node 110 may send control information over both carriers 142, 144 in the form of respective preambles 210, 220 at $t_1$. The S node 110 may further send broadcast messaging/indicators 212, 222 over respective carriers 142, 144 at $t_2$. The S node 110 may also send a common messaging 214 over the primary carrier 142 at $t_2$. The common messaging 214 may provide downlink (DL) allocations 216, 226 and uplink (UL) allocations 218, 228 for respective carriers 142, 144. The S node 110 may then communicate with the D node 130 by sending additional control information via the primary carrier 142, and media information via the secondary carrier 144, at time $t_3$ and moving forward.

In various embodiments, the nodes 110, 130 may be arranged to communicate control information over the primary carrier 142 and media information over the secondary carrier 144 using the respective radios 160, 164. In some cases, however, a node may include multiple radios, with each radio utilizing the same or a different bandwidth, duplexing or communication technology as the primary carrier. Consequently, the carrier management modules 170, 174 may facilitate data aggregation across a heterogeneous mix of carriers. In this case, the multicarrier scheme can be used for a mix of different terminals with different capabilities as shown in Table 1 as follows:

TABLE 1

| Device Type | Capabilities |
|---|---|
| Type 0 | Legacy devices, no multiple carriers support |
| Type 1 | Single contiguous Band, Multiple Carriers but Single Carrier at a time |
| Type 2 | Single contiguous Band, Multiple Carrier Device (TX and/or RX) |
| Type 3 | Multiple non-contiguous bands, Carriers but Single Carrier at a time |
| Type 4 | Multiple non-contiguous bands, Multiple Carrier Device (TX and/or RX) |

With reference to Table 1, in general the associated MAC and signaling messages during the data traffic exchanges (e.g., link adaptation, HARQ ACK/NAK and channel quality feedback) can be transmitted in the same carrier in which data is sent. Alternatively, and if multiple simultaneous carriers are supported (Types 2, 4), such messages can be combined for all carriers and sent on the primary carrier 142. To support Types 1, 3, in addition to the data and associated MAC signaling, the secondary carrier 144 will also include broadcast notifications to ensure that the device directed to a secondary carrier 144 can be directed back to primary carrier 142 if there is urgent message to be delivered to them. The broadcast notifications on the secondary carriers 144 can be binary indicators, for example, to which terminals will hash based on a MAC address or self-contained and addressed MAC messages. All Type 1 and 3 terminals directed to a secondary carrier 144 should monitor such broadcast notifications for the frame during which they use that secondary carrier 144.

The availability of heterogeneous radio technologies presents additional opportunities to flexibly allocate bandwidth for a multicarrier communication system. For example, some embodiments may extend the multicarrier scheme to enable Layer 2 or Layer 3 coupling of a primary OFDMA based technology deployed in the primary carrier 142, in this case WiMAX II, with an alternative radio co-located and deployed on the secondary carrier. The coupling may be accomplished at the signaling and MAC layer depending on the specific design of the alternative technology used for the second carrier. One example of this coupling and it benefits can be shown with a mix of WiMAX and DVB-H technology. In this case, the primary carrier 142 is used for all unicast and some multicast services, while allocating large blocks of video broadcasting on a secondary broadcast only WiMAX or DVB-H secondary carrier 144. Consequently, the client state is managed by the WiMAX network, while broadcast content is delivered on a broadcast optimized system. This level of coupling allows the user to receive data from either or both carriers without losing its power saving capability.

Referring again to FIG. 2, an S node 220 may include multiple physical layer devices (PHY) 202-1-$r$. An example of a physical layer device may include a radio that is compliant with a given air interface as defined by one or more standards or protocols. The S node 220 may be representative of, for example, the S node 110 with the addition of multiple radios (PHY 202-1-$r$). As shown in FIG. 2, the S node 220 may include a first transmitter node (PHY 202-1) to communicate control information over the primary carrier 142, and a second transmitter node (PHY 202-2) to communicate media information over the secondary carrier 144. In various embodiments, the PHYs 202-1, 202-2 may be arranged to use different protocols. For example, the PHY 202-1 may comprise an IEEE 802.16 compliant radio, while the PHY 202-2 may comprise an ETSI DVB-H compliant radio.

In various embodiments, the S node 220 may communicate with one or more D nodes 210-1-$s$ using the primary carrier 142 (RF1) and/or the secondary carrier 144 (RF2). The D nodes 210-1-$s$ may be representative of, for example, the D node 130, some of which have multiple radios. For example, the D node (client 1) 210-1 may have a single PHY 204-1, while the D node (client 2) 210-2 may have PHYs 204-1, 204-2, and the D node (client 3) 210-3 may have PHYs 204-1, 204-3. It may be appreciated that the PHYs 204-1-$s$ are designed to match corresponding PHYs 202-1-$r$ in order to properly transmit and receive information between the various nodes.

As shown in FIG. 2, the D node 210-1 may have a PHY 204-1 to match the PHY 202-1 of the S node 220. Further, the PHY 204-1 of the D node 210-1 may be arranged to operate using the primary carrier 142 (RF1) within the RF spectrum allocation of 10 MHz. In this example, the D node 210-1 may be representative of a Type 0 device as described in Table 1, which means it is a legacy device with no multiple carrier support.

As further shown in FIG. 2, the D node 210-2 may have PHYs 204-1, 204-2 to match the respective PHYs 202-1, 202-2 of the S node 220. As with the D node 210-1, the PHY 204-1 of the D node 210-2 may be arranged to operate using the primary carrier 142 (RF1) within the RF spectrum allocation of 10 MHz. In addition, the PHY 204-2 of the D node 210-2 may be arranged to operate using the secondary carrier 144 (RF2) within the RF spectrum allocation of 20 MHz. In this case, the D node 210-2 may be representative of Type 2, 3 or 4 devices as described in Table 1.

As further shown in FIG. 2, the D node 210-3 may have PHYs 204-1, 204-3 to match the respective PHYs 202-1, 202-3 of the S node 220. As with the D nodes 210-1, 210-2, the PHY 204-1 of the D node 210-3 may be arranged to operate using the primary carrier 142 (RF1) within the RF spectrum allocation of 10 MHz. In addition, the PHY 204-3 of the D node 210-3 may be arranged to operate using another secondary carrier 144 (RF3) within the RF spectrum allocation of 20 MHz. In this case, the D node 210-3 may be representative of Type 2, 3 or 4 devices as described in Table 1.

In order to support the coordination and management of heterogeneous radios, some embodiments may utilize one or more special control messages to enable the multicarrier capabilities for the given air interface technology. In one embodiment, for example, the carrier management modules 170, 174 may be arranged to generate and transmit an Enhanced Broadcast Channel Configuration (EBCC) messaging layer to define a multicarrier channel configuration on the serving cell. The EBCC messaging layer may be used to communicate various types of channel configuration information. For example, the EBCC messaging layer should be used to communicate some or all of the types of information listed in Table 2 as follows:

TABLE 2

| Type<br>Primary Carrier Parameters | Examples |
| --- | --- |
| Carrier Index<br>Parameters | 1, 2, etc<br>Carrier Index<br>Technology Type<br>Carrier Parameters (if different than the Primary), including:<br>Center Frequency<br>Bandwidth<br>FFT size<br>Frame Size<br>DL/UL ratio |
| Secondary Carriers List (only send values if different than Primary) | Carrier Index<br>Technology Type<br>Carrier Parameters (if different than the Primary), including:<br>Center Frequency<br>Bandwidth<br>FFT size<br>Frame Size<br>DL/UL ratio |

In addition to EBCC signaling, traffic allocations should have the flexibility of pointing to data regions in the primary carrier and/or secondary carriers. The allocations can be made to a single region in the primary carrier or secondary carrier. The allocations can also point to multiple data regions across multiple carriers at the same or different sub-frames. Simultaneous allocations may also exist across multiple carriers. For more effective vertical inter-technology hand-offs, some embodiments can also define and advertise delta channel configurations for all primary carriers on neighboring base stations. This can include differences in technology type, center frequency, channel size, scanning rules, intervals, durations, triggers, and so forth.

In various embodiments, the carrier management modules 170, 174 may allow substantially simultaneous aggregation of multiple carriers for a first class of client devices, and switching between primary and secondary carriers for a second class of client devices. Examples for a first class of client devices may include higher end client terminals having radio capabilities for high-speed broadband communications, such as WiMAX or WiMAX II client terminals. In this case, the carrier management modules 170, 174 may provide for data aggregation across a greater number of carriers to provide greater amounts of bandwidth appropriate to the communications capabilities of the client device. Examples for a second class of client devices may include lower end client terminals having communications capabilities lower than the first class of client devices. In this case, the carrier management modules 170, 174 may provide fast and seamless switching between primary and secondary carriers to increase effective bandwidth utilization for the relatively limited communications resources of the second class of client devices.

Figure 3:
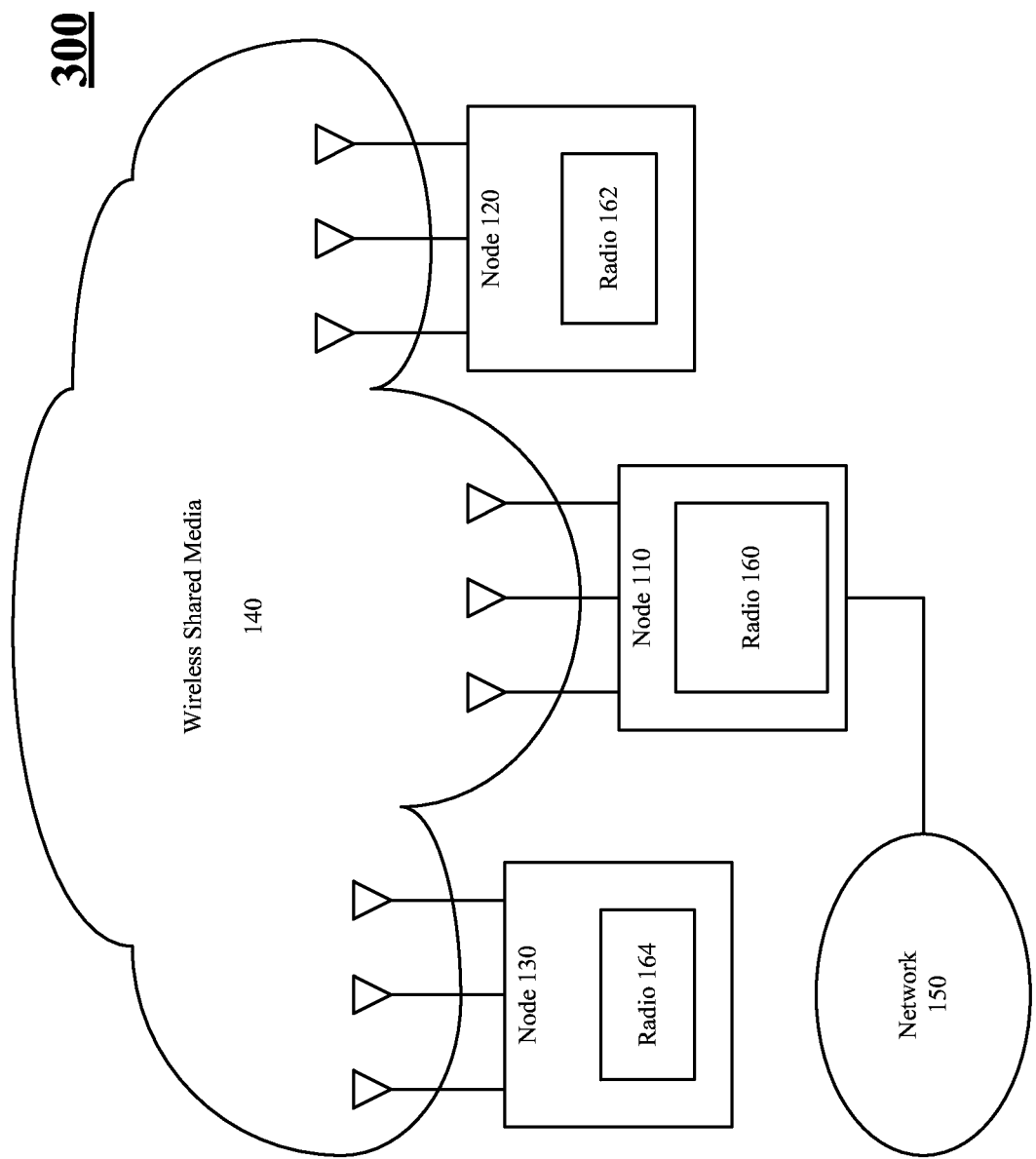
FIG. 3 illustrates one embodiment of a communications system.

FIG. 3 illustrates one embodiment of a communication system 300 implementation of the network 100. FIG. 3 may illustrate, for example, a block diagram of a system 300. System 300 may comprise, for example, a communication system having multiple nodes, including nodes 110, 120, 130. The node 120 is a wireless client device similar to the D node 130, and is included to merely represent that multiple client devices (D nodes 120, 130) may be in communication with the S node 110 while simultaneously using portions of the primary carrier 142 and the secondary carrier 144.

Embodiments of system 300 may include one or more fixed, stationary or mobile client devices and network points of attachment, such as the nodes 110, 120, 130 described with reference to FIG. 1. In one embodiment, for example, the nodes 110, 120, 130 may comprise respective radios 160, 162, 164, as described with reference to FIG. 1. In various embodiments, the radios 160, 162, 164 may each comprise WiFi, WiMAX, Bluetooth, Ultra-Wideband (UWB), and/or cellular compliant modules, or any combinations thereof, to communicate over respective wireless networks, for example.

In one embodiment, system 300 nodes 110, 120, 130 may comprise fixed wireless devices. A fixed wireless device may comprise a generalized equipment set providing connectivity, management, and control of another device, such as a mobile client device. Examples for nodes 110, 120, 130 with fixed wireless devices may include a wireless AP, base station or node B, router, switch, hub, gateway, and so forth. In other embodiments, for example, nodes 110, 120, 130 may comprise WiFi WLAN AP, WiMAX broadband wireless base stations, among other technology APs and/or base stations for WLAN, WMAN, wireless personal area network (WPAN), wireless wide area network (WWAN), cellular, and others, for example. Although some embodiments may be described with nodes 110, 120, 130 implemented as a WiFi WLAN access point or WiMAX wireless broadband base station by way of example, it may be appreciated that other embodiments may be implemented using other wireless devices and technologies as well. The embodiments are not limited in this context.

Operations for various embodiments may be further described with reference to the following figures and accompanying examples. Some of the figures may include a logic flow. It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

FIG. 4 illustrates one embodiment of a logic flow 400. The logic flow 400 may be representative of the operations performed by one or more nodes of the systems 100, 300, including the carrier management modules 170, 174, for example. As shown in FIG. 4, the logic flow 400 may define a primary carrier and a secondary carrier for use by a multicarrier communications system, the secondary carrier having a communication parameter different from the primary carrier, at block 402. In some cases, the logic flow 400 may define multiple secondary carriers for the primary carrier. In other cases, the logic flow 400 may define multiple primary carriers for the secondary carrier. In still other cases, the logic flow 400 may define multiple primary carriers for multiple secondary carriers. The embodiments are not limited in this context.

As further shown in FIG. 4, the logic flow 400 may communicate control information using the primary carrier and media information using the secondary carrier at block 404. Alternatively, or substantially simultaneously, the logic flow 400 may communicate control information using the secondary carrier and media information using the primary carrier.

In one embodiment, for example, a communication parameter for the primary carrier or the secondary carrier may be dynamically modified based on a system performance parameter. Examples of communication parameters may include without limitation a channel bandwidth, duplexing mode, spectrum allocation, or downlink-to-uplink ratio value. Examples of system performance parameters may include without limitation a system load value, a system peak rate value, a priority value or a quality of service value. By way of example, the primary carrier may be initially assigned a first portion of RF spectrum, and the secondary carrier may be initially assigned a second portion of RF spectrum. In some cases, the first portion and second portion may be contiguous RF spectrum, and in other cases non-contiguous RF spectrum. The carrier management modules 170, 174 may be implemented to monitor various system performance parameters, such as an instantaneous system load. If the instantaneous system load rises above a threshold value, thereby potentially indicating that a relatively large number of wireless client devices are using the primary and secondary carriers, the carrier management modules 170, 174 may increase or decrease bandwidth for the primary carriers or secondary carriers by creating or destroying some carriers. This is merely one example, and many different types of scenarios may be implemented in accordance with these principles.

In some cases, various embodiments may be implemented as an article of manufacture. The article of manufacture may include a storage medium arranged to store logic and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A wireless communication device, comprising:
    a processor to perform carrier aggregation of multiple wireless carriers to provide variable bandwidth for a multicarrier wireless communications system comprising an orthogonal frequency division multiple access (OFDMA) system, each of the aggregated wireless carriers to utilize a different portion of radio frequency spectrum, with a number of the aggregated wireless carriers to increase or decrease based on an amount of bandwidth needed by a client device, the aggregated wireless carriers to include a primary wireless carrier and a secondary wireless carrier, the secondary wireless carrier to differ from the primary wireless carrier with respect to one or more communication parameters comprising at least one of amount of channel bandwidth and duplexing mode; and a wireless transceiver to communicate information over the aggregated wireless carriers using orthogonal frequency division multiplexing symbols.

2. The wireless communication device of claim 1, each of the aggregated wireless carriers arranged to communicate control information, media information, or control information and media information.

3. The wireless communication device of claim 1, the primary wireless carrier to utilize a first portion of the radio frequency spectrum for use by the multicarrier wireless communications system, and the secondary wireless carrier to utilize a second portion of the radio frequency spectrum for use by the multicarrier wireless communications system, wherein the first and second portions comprise contiguous radio frequency spectrums.

4. The wireless communication device of claim 1, the primary wireless carrier to utilize a first portion of the radio frequency spectrum for use by the multicarrier wireless communications system, and the secondary wireless carrier to utilize a second portion of the radio frequency spectrum for use by the multicarrier wireless communications system, wherein the first and second portions comprise non-contiguous radio frequency spectrums.

5. The wireless communication device of claim 1, the primary wireless carrier to utilize a time division duplex (TDD) mode.

6. The wireless communication device of claim 1, the primary wireless carrier to communicate hybrid automatic repeat request (HARQ) signals.

7. The wireless communication device of claim 1, the primary wireless carrier to communicate uplink information.

8. The wireless communication device of claim 1, the processor to aggregate another secondary wireless carrier with the primary wireless carrier and the secondary wireless carrier to further increase effective bandwidth for the multicarrier wireless communications system.

9. The wireless communication device of claim 1, the wireless transceiver to communicate control information over a first wireless carrier among the aggregated wireless carriers and media information over a second wireless carrier among the aggregated wireless carriers.

10. A system, comprising:
a node to increase effective bandwidth for a multicarrier wireless communications system by performing aggregation across multiple wireless carriers to provide variable bandwidth for the multicarrier wireless communications system, the aggregated wireless carriers to include a primary wireless carrier and multiple secondary wireless carriers, the node comprising:
an antenna array;
a radio to connect to the antenna array; and
a processor to connect to the radio, the processor to aggregate the multiple wireless carriers, the primary wireless carrier arranged to communicate primarily control information and limited media information, the multiple secondary wireless carriers arranged to communicate primarily media information and limited control information, at least one aggregated wireless carrier to differ from at least one other aggregated wireless carrier with respect to one or more communication parameters comprising at least one of amount of channel bandwidth and duplexing mode.

11. The system of claim 10, the primary wireless carrier and the secondary wireless carriers to utilize different portions of a radio frequency spectrum of the multicarrier wireless communications system, wherein the different portions comprise contiguous radio frequency spectrums.

12. The system of claim 10, the primary wireless carrier and the secondary wireless carriers to utilize different portions of a radio frequency spectrum of the multicarrier wireless communications system, wherein the different portions comprise non-contiguous radio frequency spectrums.

13. The system of claim 10, the primary wireless carrier to utilize a time division duplex (TDD) mode.

14. The system of claim 10, the processor to aggregate another secondary wireless carrier with the primary wireless carrier and the multiple secondary wireless carriers to further increase effective bandwidth for the multicarrier wireless communications system.

15. The system of claim 10, the multicarrier wireless communications system comprising an orthogonal frequency division multiple access (OFDMA) system.

16. A wireless client device, comprising:
an antenna array; and
a radio to connect to the antenna array, the radio to receive primarily control information and limited media information over a primary wireless carrier defined with a first portion of a radio frequency spectrum for use by a multicarrier wireless communications system, and receive primarily media information and limited control information over a secondary wireless carrier defined with a second portion of the radio frequency spectrum for use by the multicarrier wireless communications system, wherein the primary wireless carrier and the secondary wireless carrier are aggregated to increase effective bandwidth for the multicarrier wireless communications system, the secondary wireless carrier to differ from the primary wireless carrier with respect to one or more communication parameters comprising at least one of amount of channel bandwidth and duplexing mode.

17. The wireless client device of claim 16, wherein the first portion of the radio frequency spectrum and second portion of the radio frequency spectrum comprise contiguous radio frequency spectrums.

18. The wireless client device of claim 16, wherein the first portion of the radio frequency spectrum and second portion of the radio frequency spectrum comprise non-contiguous radio frequency spectrums.

* * * * *